United States Patent [19]
Plourde

[11] Patent Number: 6,080,252
[45] Date of Patent: *Jun. 27, 2000

[54] ZIPPER COMPONENT AND METHOD FOR FORMING SAME

[75] Inventor: Eric P. Plourde, Tinley Park, Ill.

[73] Assignee: Illinois Tool Works Inc., Glenview, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/944,480

[22] Filed: Oct. 6, 1997

[51] Int. Cl.[7] .................................................. A41H 37/00
[52] U.S. Cl. .......................... 156/66; 156/66; 156/244.1; 156/244.18; 156/247; 156/289; 156/344; 156/244.25; 24/587; 264/176.1; 264/177.1; 264/177.17; 264/177.19; 264/211.12
[58] Field of Search ................................. 156/66, 244.11, 156/244.18, 247, 289, 344, 244.25; 24/587; 264/176.1, 177.1, 177.17, 177.19, 211.12, 178 R, 348; 493/211, 215

[56] References Cited

U.S. PATENT DOCUMENTS

| | | |
|---|---|---|
| 4,428,788 | 1/1984 | Kamp . |
| 4,561,109 | 12/1985 | Herrington . |
| 4,683,015 | 7/1987 | Wagers .................................... 156/66 |
| 4,696,779 | 9/1987 | Wideman . |
| 4,741,789 | 5/1988 | Zieke et al. . |
| 4,892,414 | 1/1990 | Ausnit ...................................... 383/63 |
| 4,947,525 | 8/1990 | Van Erden . |
| 4,968,370 | 11/1990 | Watkins . |
| 5,171,499 | 12/1992 | Cehelnik et al. . |
| 5,204,037 | 4/1993 | Fujii . |
| 5,536,459 | 7/1996 | Morita . |
| 5,566,429 | 10/1996 | Martinez et al. . |
| 5,655,273 | 8/1997 | Tomic et al. . |
| 5,749,658 | 5/1998 | Kettner ................................... 383/204 |

FOREIGN PATENT DOCUMENTS 0 122 721  10/1984  European Pat. Off. .

Primary Examiner—Sam Chuan Yao
Attorney, Agent, or Firm—Pitney, Hardin, Kipp and Szuch LLP

[57] ABSTRACT

An zipper component is formed by extruding a flange, extruding a profile, depositing the flange onto the top surface of a continuous carrier web, depositing the profile onto the top surface of the flange, cooling the flange and profile and stripping the flange and profile from the carrier web for further processing.

10 Claims, 2 Drawing Sheets

ZIPPER COMPONENT AND METHOD FOR FORMING SAME

BACKGROUND OF THE INVENTION

1. Field of the Invention

This invention relates to a zipper component tape or strip for resealable plastic bags and the like and a method for forming the zipper component. More particularly, this invention relates to a zipper component wherein a continuous molten stream of thermoplastic material is formed as a base and brought into contact with a continuous carrier web driven by a series of rollers. Mating profiles are extruded onto the base, and the extrudate is stripped from the carrier web before the extrudate makes a complete circuit around the web.

2. Description of the Prior Art

In known processes for forming extruded zipper profiles for resealable plastic bags such as that described in U.S. Pat. No. 4,741,789, a base member is extruded and deposited onto a bag film web. A profile member is thereafter extruded and deposited onto the base member, thus adhering the profile to the bag film web. Because the profile and base members are deposited directly onto the bag film web immediately after extrusion, the bag film web must be of such a material and configuration as to be subjected to the disclosed process. Thus, the effectiveness of such processes is limited.

U.S. Pat. No. 4,894,975 discloses a method of manufacturing reclosable plastic bags in a vertical form and seal machine wherein a strip or tape carrying the profiles is used to provide the closure for the bag and to complete the bag formation.

U.S. Pat. No. 5,188,461 describes a method of manufacturing profile portions for packings, wherein the profiled portion is not deposited directly onto the packing. According to the method disclosed, a profiled outer layer is secured to an intermediate binding layer, which is secured to a base layer. The base layer is preferably made of the same material as the packing, allowing the base layer to be secured to the packing. By requiring the foregoing three layers, the disclosed method is not cost effective.

Other known methods of forming zipper components have used the extruded profile to pull itself through the equipment for manufacturing the same. To minimize deformation of the extruded profile due to tensile forces created in such methods, it is necessary to cool and solidify the extrudate as quickly as possible after extrusion. Water baths and cooled air have been utilized to cool and solidify the extrudate. However, such quenching methods do not permit typical post-extrusion forming of the extrudate. Further, such quenching methods do not eliminate deformation of relatively small unsupported profiles by tensile forces caused by the manufacturing equipment.

Therefore, in order to alleviate these problems, it is an object of the present invention to provide a zipper component and a method for forming a zipper component which does not expose the extruded profile to potentially damaging forces. Another object of the present invention is to provide a zipper component and a method for forming a zipper component wherein a support for the extruded profile does not become part of the finished zipper component. Yet another object of the present invention is to provide a low-cost method for forming a zipper component.

SUMMARY OF THE INVENTION

The above and other beneficial objects are obtained in accordance with the present invention by providing a method of forming a zipper component wherein a carrier web is temporarily utilized to provide a stable base for an extrudate while the extrudate is in an unsolidified and relatively unstable state.

DETAILED DESCRIPTION OF THE PREFERRED EMBODIMENTS

The foregoing figures illustrate a zipper component and a method of forming a zipper component in which identical numerals in each figure represent identical elements.

Figure 1:
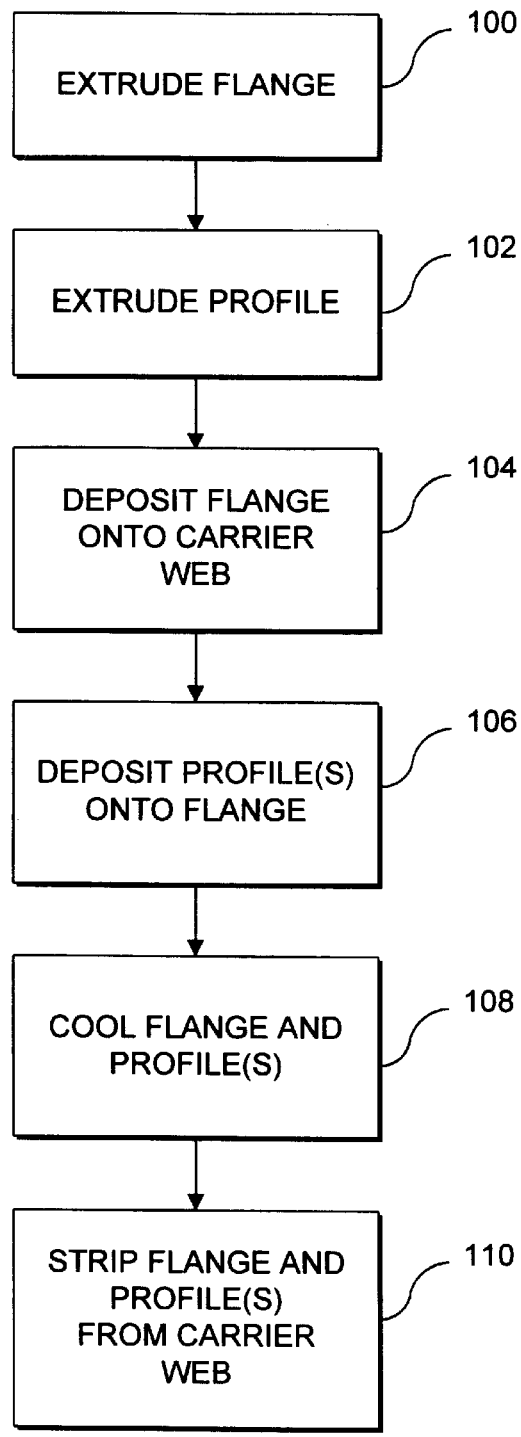
FIG. 1 is a block diagram of the method according to the present invention.
Figure 2:
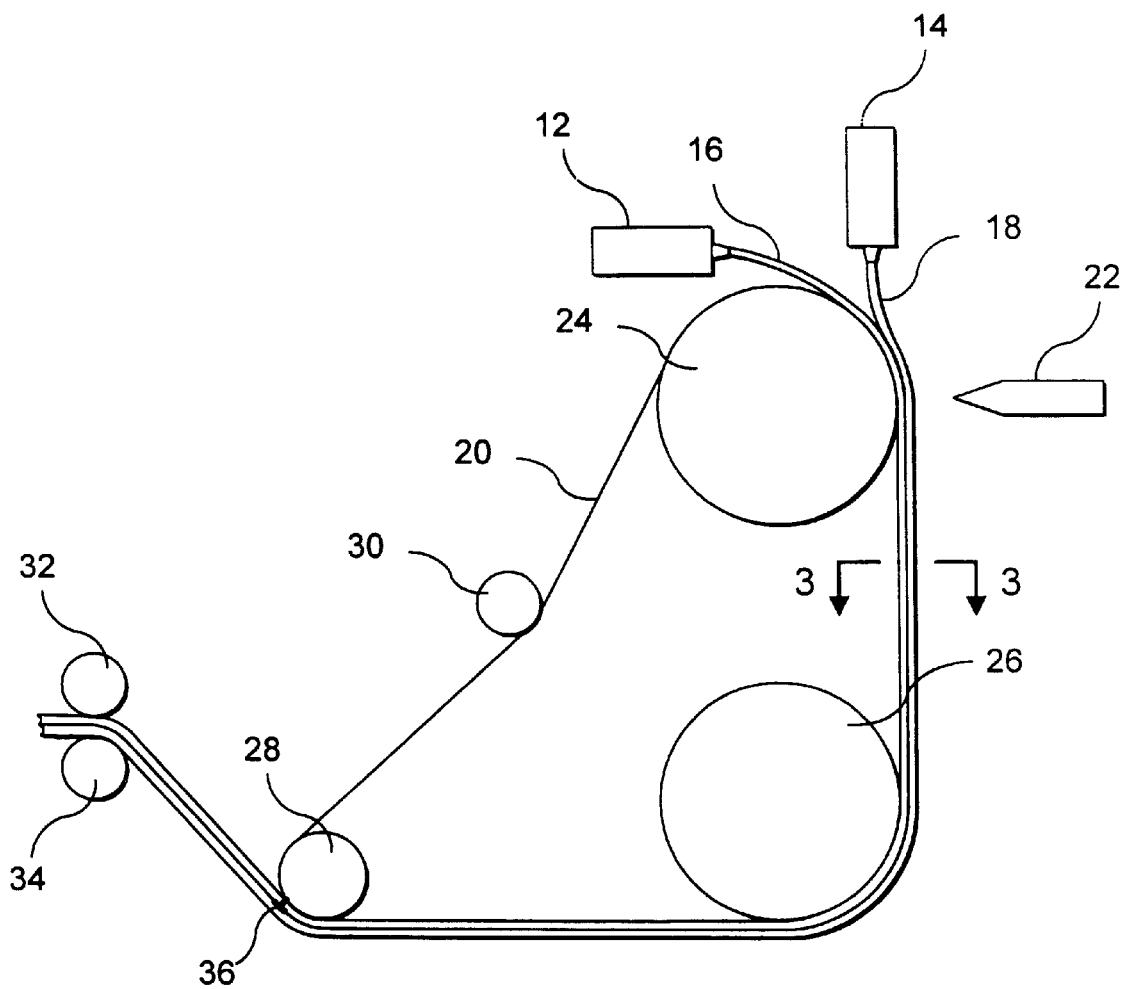
FIG. 2 is a side elevational view of an apparatus employing the method according to the present invention.

FIG. 1 illustrates a block diagram of the method of forming a zipper component in accordance with the present invention, and FIG. 2 illustrates an apparatus 10 for forming a zipper component according to the method of the present invention. First, in step 100, a flange 16 is extruded by a flange die 12. Next, in step 102, a profile 18 is extruded by a profile die 14. Preferably, flange 16 and profile 18 are each made of a polymeric resin. Depending upon the intended application of flange 16 and profile 18, it may be preferable to select differing materials for flange 16 and profile 18.

Figure 3:
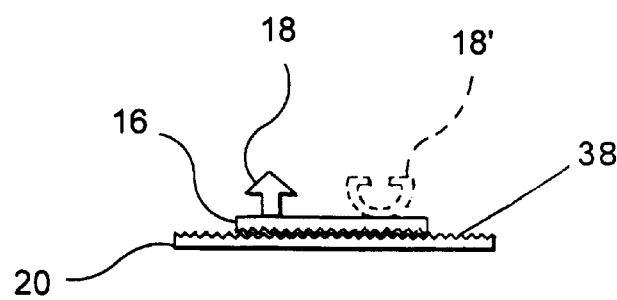
FIG. 3 is a section view taken along reference lines 3—3 of FIG. 2.

Next, in step 104, flange 16 is deposited onto the top surface of a continuous carrier web 20 in the area of carrier web 20 generally supported by cast roller 24. A sealant material may be co-extruded onto one or both surfaces of flange 16 before depositing flange 16 onto carrier web 20, or a sealant material may be extruded onto the upper surface of flange 16 after depositing flange 16 onto carrier web 20 prior to depositing profile 18 onto flange 16 as described below. Carrier web 20 forms an endless loop around cast roller 24, driving roller 26 and stripping roller 28 and is driven by driving roller 26. Driving roller 26 is driven by an electric motor or other driving means, not shown. Adjusting/steering roller 30 is provided between stripping roller 28 and cast roller 24 to adjust and maintain the tension of carrier web 20. Carrier web 20 may be made of a suitable material, such as Teflon, to which flange 16 will not adhere or conditioned to prevent adherence or slippage. The top surface of carrier web 20 may have a texture 38, as shown in FIG. 3, such as a grid-like texture. The particular texture of the carrier web 20 is imparted to the flange 16 to increase the capability of flange 16 to bond to a substrate in such intended applications as recloseable plastic bags. By imparting a grid-like structure to the surface of flange 16 and bonding flange 16 to a substrate, fluid leaks between the bonded surface of flange 16 and the substrate are minimized or eliminated, requiring such fluids to follow a tortuous path to subtend the bonded flange 16. At least the top surface of carrier web 20 may also have a treatment to provide adequate adhesion so that flange 16 does not intermittently slip and reattach to carrier web 20 and to allow release of flange 16 at the stripping point 36 as described below. The treatment may consist of raising or lowering the temperature of carrier web 20 at specific points to facilitate such adhesion and detachment, or the treatment may be a release agent being applied to the top surface of carrier web 20 prior to depositing flange 16 thereon.

Next, in step 106, profile 18 is deposited onto the top surface of flange 16 or onto the top surface of the sealant material if a sealant material is co-extruded onto the top surface of flange 16 as described above. While the material selected for flange 16 may differ from the material selected for profile 18, the materials selected should permit profile 18 to bond with flange 16 and permit flange 16 to bond with the substrate. Obviously, numerous shapes are available for profile 18, and only a representative shape is depicted. Next, in step 108, flange 16 and profile 18 are cooled by adjusting/cooling nozzle 22, thereby stabilizing and setting flange 16 and profile 18. Water may be ejected from adjusting/cooling nozzle 22 to cool flange 16 and profile 18. As illustrated in FIG. 2, carrier web 20 is disposed vertically between cast roller 24 and driving roller 26, which ensures that any water deposited on flange 16 and/or profile 18 during cooling will be removed. While flange 16 and profile 18 are carried by carrier web 20, no tensile forces are imparted on flange 16 or profile 18 to guide flange 16 and profile 18 through the apparatus 10. Thus, deformation of flange 16 and profile 18, even when flange 16 and profile 18 are relatively small, is eliminated.

Finally, in step 110, flange 16 and profile 18 are stripped from carrier web 20 at the stripping point 36. The stripping point 36 is in the general area of carrier web 20 where the path of carrier web 20 turns about stripping roller 28. Flange 16 and profile 18, after being stripped from carrier web 20, are guided through top take-off roller 32 and bottom take-off roller 34 for further processing, such as rolling and storing, shipping or application to a substrate.

It will be appreciated that flange 16 and profile 18 will be supported by carrier web 20 while flange 16 and profile 18 are in an unsolidified and relatively unstable state. It will be further appreciated that while flange 16 and profile 18 are in such an unsolidified and relatively unstable state, the apparatus 10 does not impart tensile forces to deform flange 16 or profile 18. As carrier web 20 provides a stable base for flange 16 and profile 18 during setting, post-extrusion forming of the profile 18 or forming a relatively small unsupported flange 16 and profile 18 is possible. Finally, because carrier web 20 does not form an integral part of the finished product, no material is lost in the process, thereby reducing costs.

Advantageously, flange 16 is formed to a thickness of 2 to 8 mils, compared with traditional zipper components having a flange thickness of at least 6 mils. By forming flange 16 with a thickness of, for example, 2 mils, the temperature required for fusing flange 16 to a substrate, such as a bag film, not shown, is reduced from approximately 280 degrees for a typical 6–8 mils thickness flange 16 to approximately 245 degrees for a 2 mils thickness flange 16 formed in accordance with the present method. By reducing the fusing temperature of the flange 16, the speed of fusing the zipper component is thereby increased. Similarly, the zipper component formed according to the method of the present invention eliminates the need to pre-soften or stamp the zipper for side sealing effectiveness since less material is available to soften and act as a heat sink than traditional zipper components.

As described above, flange 16 is first deposited onto the top surface of carrier web 20, and profile 18 is then deposited onto the top surface of flange 16. Alternatively, flange 16 and profile 18 may be extruded and deposited onto the surface of carrier web 20 simultaneously, either as discrete components or as a single component, or a so-called string zipper.

In the above description, a single profile 18 is depicted on flange 16. If desired, such as for applications as described in the aforementioned U.S. Pat. No. 4,394,975, a pair of mating profiles 18 could be deposited in parallel relationship onto the same flange 16 to provide a zipper tape. Thus, a male profile 18 and female profile 18' could both be deposited onto flange 16 as shown in FIG. 3, wherein the optional profile 18' is shown in phantom.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A method of making a zipper component, to be fused to a substrate comprising the steps of:

extruding a zipper flange substantially smaller than 6 mils directly onto a top surface of a carrier web, said carrier web having a texture and being formed in an endless loop whereby said texture is imparted to a bottom surface of said zipper flange;

extruding a zipper profile onto a top surface of said zipper flange;

carrying said zipper flange directly on a top surface of said carrier web and carrying said zipper flange and said zipper profile on said carrier web in an un-set condition without imparting tensile forces to said un-set zipper flange and profile; and stripping said zipper flange from said carrier web after said profile has been extruded onto said zipper flange and said zipper flange and said zipper profile have set on said carrier web.

2. The method according to claim 1, wherein said zipper component is stripped from said carrier web before completing a circuit around a path of said carrier web.

3. The method according to claim 1, further comprising the step of cooling said portion of a zipper component with water after the step of extruding said zipper component.

4. The method according to claim 1, further comprising the step of applying a release agent to said top surface of said carrier web before the step of extruding said zipper component.

5. The method according to claim 1, further comprising the step of changing a temperature of said carrier web in at least one location to facilitate adhesion of said zipper component to said carrier web.

6. The method according to claim 1, further comprising the step of changing a temperature of said carrier web in at least one location to facilitate release of said zipper component from said carrier web during the stripping step.

7. The method according to claim 1, wherein said profile and said flange are formed of differing polymeric resins.

8. The method according to claim 1, comprising the further steps of:

extruding another profile, said another profile having a mating configuration to said zipper profile;

depositing said another profile onto said top surface of said flange in parallel relationship with said zipper profile; and carrying out said stripping step after said flange, said zipper profile and said another profile have set.

9. The method according to claim 1, comprising the further step of extruding a sealant onto at least one surface of said flange.

10. The method according to claim 1, comprising the further step of extruding a sealant onto at least one surface profile.

* * * * *